UNITED STATES PATENT OFFICE.

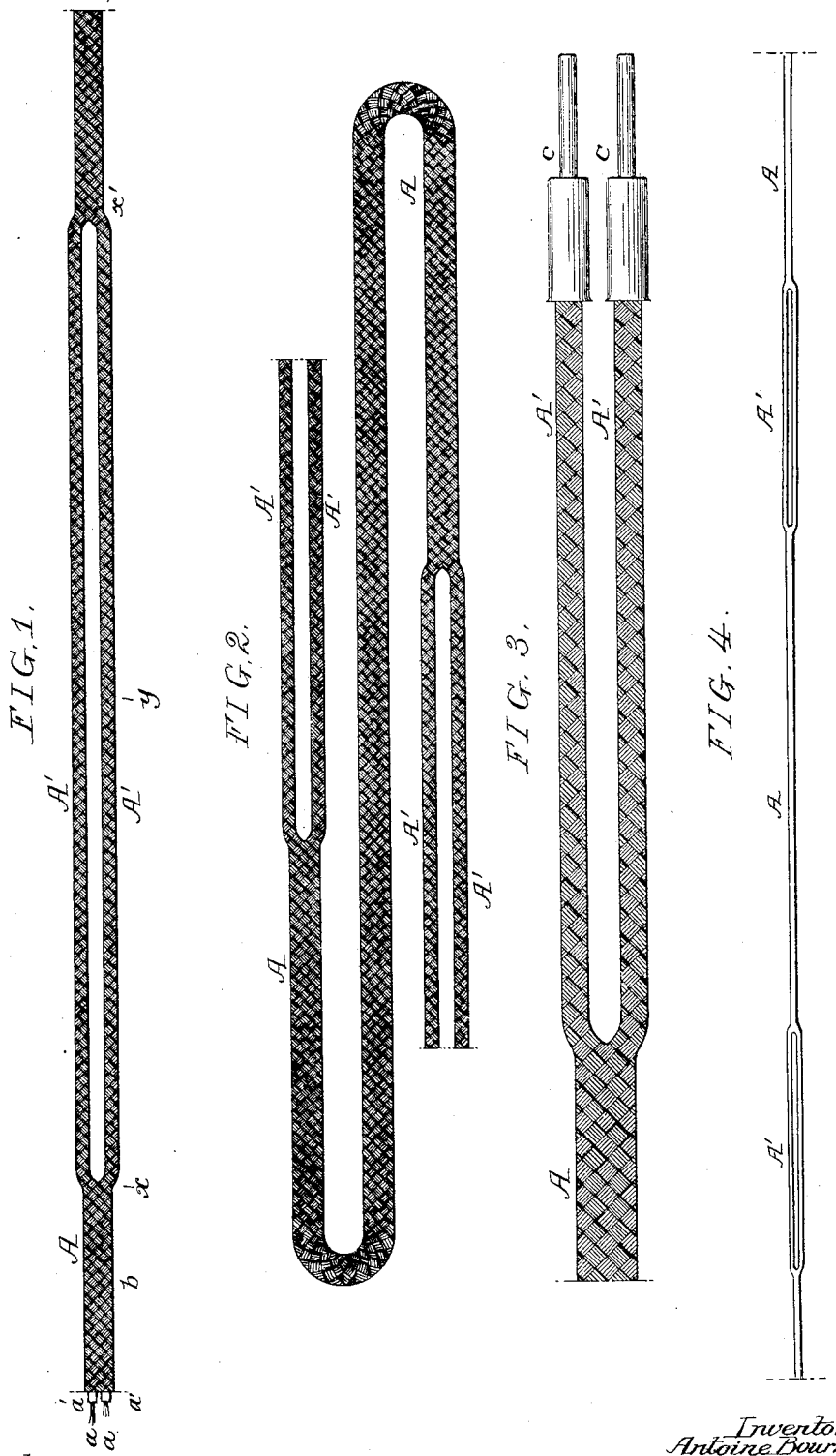

ANTOINE BOURNONVILLE, OF PHILADELPHIA, PENNSYLVANIA.

FLEXIBLE ELECTRIC CONDUCTOR.

SPECIFICATION forming part of Letters Patent No. 600,058, dated March 1, 1898.

Application filed November 20, 1897. Serial No. 659,349. (No model.)

*To all whom it may concern:*

Be it known that I, ANTOINE BOURNONVILLE, a citizen of the United States, residing in Philadelphia, Pennsylvania, have invented certain Improvements in Flexible Electrical Conductors, of which the following is a specification.

My invention relates to certain improvements in the manufacture of flexible conductors, such as telephone-cords, where two wires are mounted within a braiding and which must have their ends separated and independently wrapped, so that they may be connected to the proper terminals.

While my invention especially relates to the manufacture of telephone-cords, it is nevertheless applicable to other conductors having more than one terminal.

In the accompanying drawings, Figure 1 is a view showing a section of my improved cord as it is braided before being cut. Fig. 2 shows one end of a telephone-cord after being cut, illustrating the two braided terminals. Fig. 3 is an enlarged view of one end of a telephone-cord with the tips attached, and Fig. 4 is a diagram view.

In the manufacture of telephone-cords it has been the general practice to either use two independent cords with a conductor in each cord or braid two cords and then fasten them together by a braided covering, the covering stopping short of each end. This necessitated a bulky and unfinished joint where the two cords were joined to form a single strand. I overcome this difficulty by using a single braid both for the two terminal sections $A'$ $A'$ and the single body-section $A$, and I braid the cord in lengths having single sections and double or plural sections alternately, as in Fig. 4, so that all that is necessary is to cut the cords at the center of the double sections, as the mechanism for carrying out my invention is so timed that the cords will be the proper length. It will be understood that the length of the single cord and the length of the terminals may be increased or diminished, as desired.

In braiding the cord I take the two sets of conducting-wires $a$ $a$, preferably covered with the primary covering $a'$, Fig. 1, and place them side by side in a machine. I then preferably braid a single covering $b$ over the two wires. When the joint $x$ is reached, the braiding material is separated and braided independently over the two sections $A'$ $A'$. Thus the separation is made without showing any bulging joint or rough finish. When the braiding has reached the full length required for the two sets of wires to be braided independently, the braiding mechanism is then shifted at $x'$, so as to braid the two sets of wires in a single section $A$. This alternating of the braiding is continued, and by simply cutting the cord at $y$ a cord is produced having a single central section with two terminals at each end, to which may be attached the ordinary terminal-points $c$ $c$.

By my improvement a much stronger cord is made and one in which the parts are not liable to be unraveled and one which makes a much neater appearance than the cords now upon the market.

I claim as my invention—

1. A flexible electric conducting-cord, having a single central section and two or more terminal sections at one end, a fabric covering for said cord extending continuously over the single section and the terminal sections, substantially as described.

2. A flexible electric conducting-cord having two electric conductors therein, each conductor having a primary covering, a braided covering confining the two conductors within one strand, said braided covering being separated and braided around each conductor at one end forming a covered cord having a single section and two terminals, substantially as described.

3. As a new article of manufacture an electric conducting-cord having two sets of wires braided to form a single central section, with two terminal sections at each end, the threads of the central section being separated, one half of the threads being continued and braided on one terminal section and the other half being continued and braided on the other terminal section, substantially as described.

4. As a new article of manufacture, a flexible electric conducting-cord, consisting of single sections alternating with plural sections adapted to form two or more terminals when cut, with a fabric covering for said cord extending continuously over the single sections and the plural sections, substantially as described.

In testimony whereof I have signed my name to this specification in the presence of two subscribing witnesses.

ANTOINE BOURNONVILLE.

Witnesses:
CHAS. H. BANNARD,
WILL. A. BARR.